United States Patent [19]

Aoki et al.

[11] 4,293,207

[45] Oct. 6, 1981

[54] CAMERA FOCUS DETECTING DEVICE

[75] Inventors: Harumi Aoki, Kiyose; Masahiro Kawasaki; Yoshio Sawada, both of Tokyo, all of Japan

[73] Assignee: Asahi Kogaku Kogyo Kabushiki Kaisha, Tokyo, Japan

[21] Appl. No.: 117,336

[22] Filed: Jan. 31, 1980

[30] Foreign Application Priority Data

Feb. 9, 1979 [JP] Japan .................................. 54/14042

[51] Int. Cl.$^3$ ............................................... G03B 3/00
[52] U.S. Cl. ..................................................... 354/25
[58] Field of Search ................... 354/25, 31; 352/140; 355/56

[56] References Cited

U.S. PATENT DOCUMENTS 4,171,885 10/1979 Kondo ................................... 354/25
4,189,232 2/1980 Asano et al. ....................... 354/25 X

*Primary Examiner*—Michael L. Gellner

*Attorney, Agent, or Firm*—Sughrue, Mion, Zinn, Macpeak and Seas

[57] ABSTRACT

An automatic focus detecting device for a camera in which a self-scanning photoelectric element array is scanned at a rate depending upon the average amount of light reflected from an object being photographed so that accurate focus detection is maintained over a wide range of illumination conditions. An average illumination detecting element is disposed at a position near or at a position optically equivalent to that of the microphotoelectric elements of the element array. A low-pass filter couples the output of the average illumination detecting element to a clock pulse generator which produces clock pulse signals of which the frequency varies according to the smoothed output signal from the low-pass filter representing the average illumination. As the brightness of the object increases the frequency of the clock pulse signal correspondingly increases to compensate for variations in brightness of the object.

3 Claims, 7 Drawing Figures

CAMERA FOCUS DETECTING DEVICE

BACKGROUND OF THE INVENTION

The present invention relates to a device for automatically detecting focus in a camera by detecting the contrast of the image of an object to be photographed with a self-scanning type photoelectric element. More particularly, the invention pertains to an improvement of such a device which makes it possible to detect focus even when the brightness of the object viewed changes.

It is a well-known principle that, for an optical image of an object to be photographed and formed through a lens, the difference in brightness of the image, that is, the contrast of light and shade of the image reaches its maximum value at the point of focus. This is due to the fact that the optical intensity (power spectrum) of the image with respect to each spatial frequency becomes a maximum at the point of focus. A variety of devices for detecting focus utilizing this phenomenon have been proposed in the art.

In one such device, the power spectrum distribution of the image of an object is electrically scanned with a self-scanning type photoelectric element producing a time-series signal electrically processed to dynamically detect the contrast. The self-scanning type photoelectric element includes a plurality of microphotoelectric elements and a scanning circuit. It is called a MOS-FET type or a CCD type depending on the arrangement of the scanning circuit employed, both of which are commercially available. The photoelectric element is capable of accumulating charges in correspondence with the quantity of light applied during a single scanning period. Accordingly, if the scanning rate of the photoelectric element is maintained unchanged, then the amount of charge accumulated thereby changes with the intensity of the incident light. As the scanning rate is made slower, the amount of charge accumulated is increased. Therefore, even if the intensity of light is low, the photoelectric element can provide a sufficient output.

In one example of an automatic focus detecting device utilizing a self-scanning type photoelectric element, a single edge portion having the highest contrast of the portions of the image of an object applied to an array of microphotoelectric elements is selected and the difference between the outputs of two microphotoelectric elements adjacent to or on both sides of the microphotoelectric element to which the edge portion is applied is sensed and focus is determined from the increases and decreases in the output difference. In the device, even if the contrast of an object to be photographed is constant, the difference between the outputs of the two microphotoelectric elements will vary as the brightness of the object is varied. If the intensities of lights applied to the two microphotoelectric elements are represented by $E_1$ and $E_2$, respectively, then the output difference $\Delta V$ is:

$$V = \frac{(E_1 - E_2) T_o S_p}{C_j},$$

where $T_o$ is a single scanning time period, $S_p$ is the photosensitivity of the photoelectric element, and $C_j$ is the junction capacitance.

If the brightness of an object to be photographed increases or decreases by a factor $\alpha$, then the output difference $\Delta V'$ varies correspondingly ($\Delta V' = \alpha \Delta V$). Therefore, if the brightness of the object is changed, then it is impossible to properly detect the focus point. On the other hand, in a self-scanning type photoelectric element, the dynamic range of the element's output signal with respect to luminous flux is not as wide as desired. Therefore if the scanning rate is constant, the outputs of the microphotoelectric elements mentioned above may become saturated or may drop to a noise level with the result that sometimes it is again difficult to detect the output difference.

A technique for eliminating the above-described difficulties has been known in the art. With this technique, an average illumination detecting photoelectric element is disposed adjacent to the self-scanning type photoelectric element and the scanning rate of the self-scanning type photoelectric element is varied according to the magnitude of the output of the average illumination detecting photoelectric element. That is, an output equivalent to the average ambient illumination is provided by the single photoelectric element provided for this purpose and the output produced thereby is utilized to control the scanning rate. More specifically, if, when an average illumination $\overline{E}$ is changed into a value $\overline{E}'$ upon being increased or decreased by a factor $\alpha$, the outputs $E_1'$ and $E_2'$ of the two minute photoelectric elements become equal to $\alpha E_1$ and $\alpha E_2$ ($E_1' = \alpha E_1$, and $E_2' = \alpha E_1$), respectively. The output difference $\Delta V' = \Delta V$ can be determined by setting the scanning time to $T_o' = T_o/\alpha$. With this technique, even when the average brightness of the object is changed (either increased or decreased), the output difference of the above-described two microphotoelectric elements is maintained unchanged and the dynamic range of the photoelectric output signal with respect to the luminous flux is increased and accordingly a focus indicating signal is provided even for an object low in brightness.

However, this technique is still disadvantageous in the following point. That is, if an object moves during the measuring period or the camera is shaken, then the output of the average illumination detecting photoelectric element is varied and, accordingly, the output difference between the two microphotoelectric elements is varied.

Accordingly, an object of the present invention is to provide a focus detecting device in which the above-described difficulties have been eliminated, the contrast signal of an object to be photographed is constant even if the average brightness of the object increases or decreases, the dynamic range of the photoelectric output signal with respect to luminous flux is increased thereby to provide an effective contrast signal even for an object of low in brightness and even when an object moves or the camera is shaken so that a satisfactory focus detection is carried out.

SUMMARY OF THE INVENTION

These, as well as other objects of the invention, are met by a focus detecting device for a camera including a self-scanning type photoelectric element having a plurality of microphotoelectric elements and a scanning circuit for producing a contrast signal of the image of an object to be photographed to automatically detect a point of proper focus, an average illumination detecting photoelectric element disposed at least near a position which is optically equivalent to the position of the microphotoelectric elements, a low-pass filter coupled to an output of the average illumination detecting element for removing a vibration component in an output signal thereof, and a clock pulse generator for producing a clock pulse signal of which the frequency is varied according to an output signal of the low-pass filter, the clock pulse generator being coupled to drive the self-scanning type photoelectric element so that, as the brightness of an object being viewed through the camera lens increases, the frequency of the clock pulse signal correspondingly increases varying the scan rate of the microphotoelectric elements to thereby produce a contrast signal free from the variations in brightness of the object and wherein variations in the contrast signal due to vibration due to movement of the object or a camera are eliminated.

In a preferred embodiment, the low-pass filter includes a first operational amplifier coupled to receive an output signal of the average illumination detecting photoelectric element, a resistor having one terminal coupled to an output terminal of the first operational amplifier and a first capacitor coupled between a second terminal of the resistor and a ground or reference terminal. The clock pulse generator, in the preferred embodiment, includes an input buffer amplifier having an input coupled to an output of the low-pass filter, a second operational amplifier, a second capacitor coupled between an output terminal and an inverting input terminal of the second operational amplifier, an analog switch operatively coupled across the second capacitor, and a comparator having one input terminal coupled to the output terminal of the second operational amplifier and a second input terminal coupled to a source of reference potential. The output of the comparator is coupled to a control input of the analog switch and also the clock pulse output signal is formed at the output of the comparator.

BRIEF DESCRIPTION OF THE DRAWINGS

FIG. 6 is a graphical representation indicating variations of the output of an average illumination detecting photoelectric element due to the shaking of a camera or the like.

DESCRIPTION OF THE PREFERRED EMBODIMENTS

The invention will be described with reference to the accompanying drawings.

Figure 1:
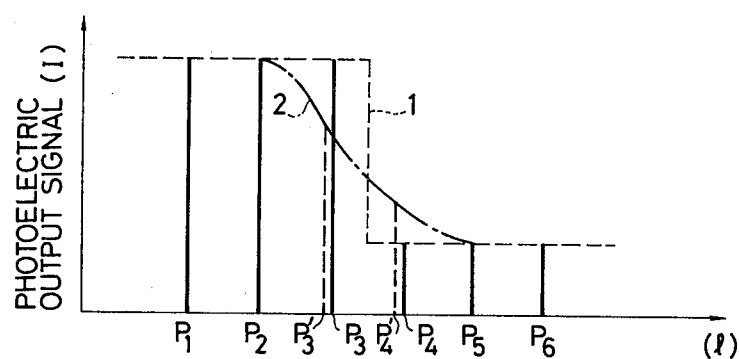
FIG. 1 is a graphical representation indicating variations in the output of a self-scanning type photoelectric element for in focussed and out focussed states.

FIG. 1 is a graphical representation indicating the response to a photoelectric output signal when an edge-shaped optical image is applied to a self-scanning type photoelectric element. In FIG. 1, reference characters $P_1$ through $P_6$ designate the positions of six microphotoelectric elements. The photoelectric output signal of each microphotoelectric element is indicated by a corresponding bar. An optical image at the position of proper focus is indicated by the dotted line 1 while the same image for a out-focussed position is indicated by the dot-dash line 2.

Figure 2:
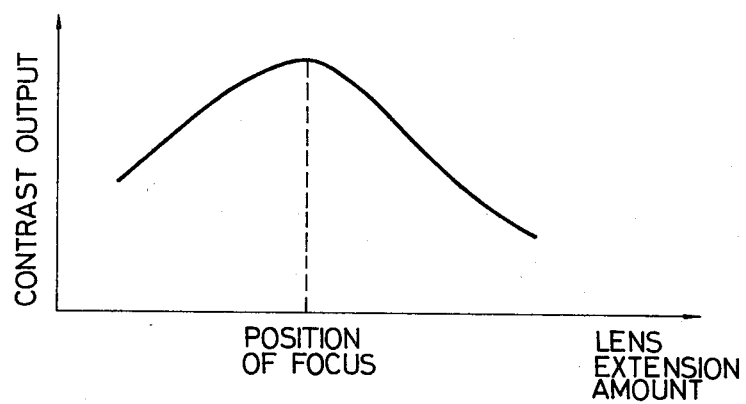
FIG. 2 is a graphical representation for a description illustrating how a contrast signal reaches its maximum at the point of focus.

In the case where the state of the optical image is varied as shown in FIG. 1, the outputs of the microphotoelectric elements indicated by $p_3$ and $p_4$ at the point of focus are changed to those indicated by $p_3'$ and $p_4'$ at a given point of out-focus. If the photoelectric output signals at $p_3$ and $p_4$ are represented by $I(p_3)$ and $I(p_4)$ and those at $p_3'$ and $p_4'$ by $I(p_3')$ and $I(p_4')$, respectively, then the absolute value $C=|I(p_3)-I(p_4)|$ of the output difference of the two elements at the point of proper focus differs from that $C'=|I(p_3')-I(p_4')|$ at the given point of out-focus. That is, the absolute value is larger at the position of the focus. The absolute value of the output difference is referred to as "contrast output". When a self-scanning type photoelectric element is placed at a position equivalent to the film surface in a camera, the contrast output, as shown in FIG. 2, is distributed in the form of an arc with respect to the amount of extension of the lens having its maximum value at the point of focus.

Figure 3:
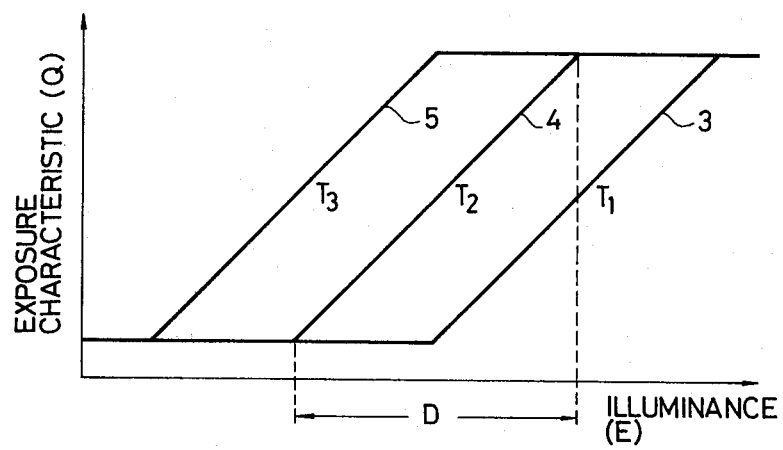
FIG. 3 is a diagram indicating a typical illuminance vs. exposure characteristic of a self-scanning type photoelectric element.

FIG. 3 is a graphical representation indicating an ordinary illuminance (E) vs. exposure (Q) characteristic of the self-scanning type photoelectric element. With respect to scanning times $T_1$, $T_2$ and $T_3$ in a single scanning period, the characteristic is varied as distributions 3, 4 and 5, respectively. The relation of these scanning times is $T_1<T_2<T_3$. A dynamic range over which the exposure is not saturated is indicated by D. If the scanning rate is constant, then the photoelectric output varies with the magnitude of illuminance in the range D. If the scanning rate is made variable depending on the brightness of an object to be photographed and the scanning rate is increased as the brightness of the object increases, then the dynamic range is increased, and, even when the average brightness of the object changes, a constant contrast signal is obtained.

Figure 4:
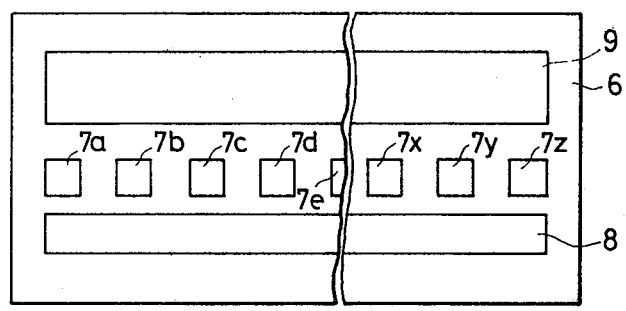
FIG. 4 is a diagram showing an example of a photoelectric element section in a focus detecting device according to the invention.

FIG. 4 shows a photoelectric element section for a preferred embodiment of a focus detecting device according to the invention. A plurality of microphotoelectric elements 7a through 7z are arranged on a photoelectric element substrate 6. A scanning circuit 9 for driving the microphotoelectric elements and an average illumination detecting photoelectric element 8 are provided near the array of microphotoelectric elements. The microphotoelectric elements and the scanning circuit together form a self-scanning type photoelectric element. The scanning rate of the self-scanning type photoelectric element can be varied in proportion to the variations (increase or decrease) of the output of the average illumination detecting photoelectric element 8.

Figure 5:
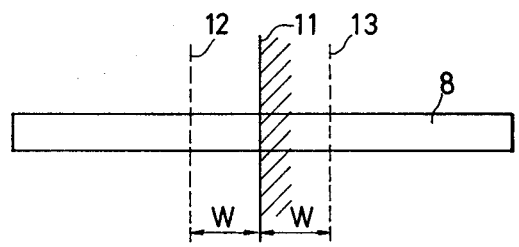
FIG. 5 is an explanatory diagram showing the movement of the image of an object to be photographed on an average illumination detecting photoelectric element.

It is not always required to provide the average illumination detecting photoelectric element 8 on the substrate. That is, the photoelectric element 8 may be provided at a position equivalent to the position of the microphotoelectric elements or near its position. In the case where the image of an object the illuminance of which is variable as sensed by the average illumination detecting photoelectric element 8 is applied thereto, the image of the object moves when the object moves or the camera is shaken. FIG. 5 illustrates the case of an image 11 of an edge-shaped object 11 moving to a position 12 or 13 at a distance W due to the reasons described above. In this case, the output of the average illumination detecting photoelectric element 8 varies even if the contrast distribution of the object remains constant. In accordance with this variation, the scanning speed is changed as a result of which the contrast signal is also changed.

Figure 6:
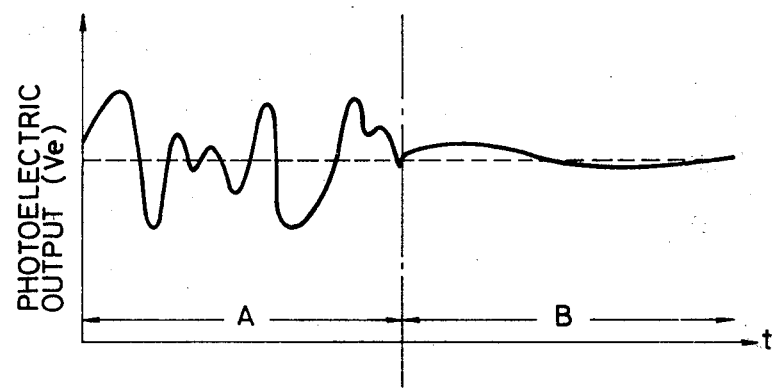

In order to eliminate this difficulty, in accordance with the invention, the output of the average illumination detecting photoelectric element 8 is smoothed to provide an output which remains nearly constant. In FIG. 6, a photoelectric output which is not as yet smooth is indicated in the region A while the smoothed photoelectric output is indicated in the region B. In general, the variation of the photoelectric output due to shaking of a camera is a disturbance having a maximum frequency on the order of several tens of Hertz. Accordingly, if frequencies higher than several Hertz in the output are removed, then effects due to shaking of the camera can be practically disregarded.

Figure 7:
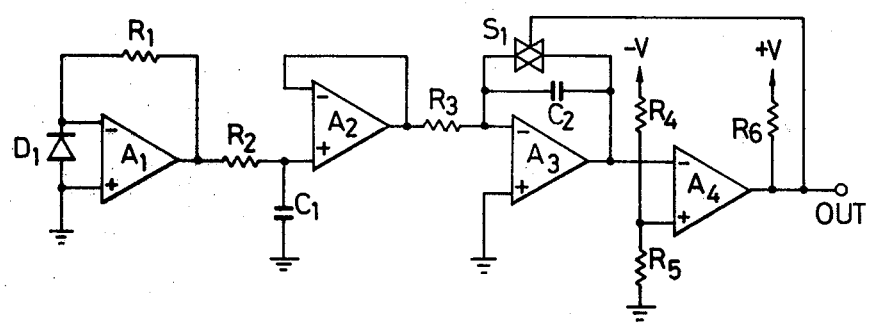
FIG. 7 is a circuit diagram, partially as a block diagram, showing an example of an electrical circuit used in the device according to the invention.

Shown in FIG. 7 is an example of an electrical circuit for the focus detecting device according to the invention. The optical current of an average illumination detecting photodiode $D_1$ is converted into a voltage by an operational amplifier $A_1$. The voltage thus produced is smoother by a low-pass filter made up of a resistor $R_2$ and a capacitor $C_1$. The signal thus smoothed is applied through a buffer amplifier or operational amplifier $A_2$ through a resistor $R_3$ to a capacitor $C_2$ connected in parallel with an operational amplifier $A_3$ so as to thereby charge the capacitor $C_2$. The output of the capacitor $C_2$ thus charged is compared with a threshold value preset by resistors $R_4$ and $R_5$ by a comparator including an operational amplifier $A_4$. When the output of the capacitor $C_2$ exceeds the threshold value, an analog switch $S_1$ is turned on so that the capacitor $C_2$ is restored to its initial condition being quickly discharged. At the same time, the state of the output of the comparator is changed thereby turning off the analog switch $S_1$. The capacitor $C_2$ is repeatedly charged and discharged in this manner as a result of which a clock pulse signal is provided at a terminal marked OUT. The clock pulse signal is applied to the scanning circuit of the self-scanning type photoelectric element to control the scanning operation.

As is apparent from the above description, in the contrast detection type focus detecting device utilizing a self-scanning type photoelectric element according to the invention, even if the average brightness of an object to be photographed changes, either increasing or decreasing, the contrast output nonetheless remains constant at all times and the dynamic range of the photoelectric output signal with respect to luminous flux is correspondingly increased. Accordingly, the focus indicating signal is accurately provided for both an object having either a low brightness or an object having an extremely high brightness and the signal thus produced is substantially free from effects caused by movement of the object or shaking of the camera. Thus, an automatic focus detection camera having a high reliability and accuracy is provided according to the invention.

What is claimed is:

1. A focus detecting device for a camera comprising: a self-scanning type photoelectric element having a plurality of microphotoelectric elements and a scanning circuit for producing a contrast signal of the image of an object to be photographed to automatically detect a point of proper focus; an average illumination detecting photoelectric element disposed at least near a position which is optically equivalent to the position of said microphotoelectric elements; a low-pass filter coupled to an output of said average illumination detecting element for removing a vibration component in an output signal thereof; and a clock pulse generator for generating a clock pulse signal of which the frequency is varied according to an output of said low-pass filter, said clock pulse generator being coupled to drive self-scanning type photoelectric element so that as the brightness of said object increases, the frequency of said clock pulse signal increases thereby to produce a contrast signal free from variations in brightness of said object and to remove variation components of said contrast signal due to movement of said object.

2. The focus detecting device of claim 1 wherein said low-pass filter comprises;
   a first predetermined amplifier coupled to receive an output signal of said average illumination detecting photoelectric element;
   a resistor having one terminal coupled to an output terminal of said first operational amplifier; and
   a first capacitor coupled between a second terminal of said resistor and a ground terminal.

3. The focus detecting device of either claim 1 or 2 wherein said clock pulse generator comprises:
   an input buffer amplifier having an input coupled to an output of said low-pass filter;
   a second operational amplifier;
   a second capacitor coupled between an output terminal and an inverting input terminal of said second operational amplifier;
   an analog switch operatively coupled across said second capacitor; and
   a comparator having one input terminal coupled to said output terminal of said second operational amplifier and a second input terminal coupled a source of a reference potential, an output of said comparator being coupled to a control input of said analog switch.

* * * * *